(12) United States Patent
Giacobbe et al.

(10) Patent No.: US 10,686,900 B2
(45) Date of Patent: Jun. 16, 2020

(54) ACTIVITY CARDS

(71) Applicant: Microsoft Technology Licensing, LLC, Redmond, WA (US)

(72) Inventors: Gail Giacobbe, Seattle, WA (US); Imran Aziz, Seattle, WA (US); Javier Porras Luraschi, Redmond, WA (US); March Rogers, Bellevue, WA (US); Benjamin B. Gitenstein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/259,284

(22) Filed: Jan. 28, 2019

(65) Prior Publication Data

US 2019/0158613 A1    May 23, 2019

Related U.S. Application Data

(63) Continuation of application No. 15/827,847, filed on Nov. 30, 2017, now Pat. No. 10,237,361, which is a continuation of application No. 13/754,899, filed on Jan. 31, 2013, now Pat. No. 9,942,334.

(51) Int. Cl.
| | | |
|---|---|---|
| *G06F 15/16* | (2006.01) | |
| *H04L 29/08* | (2006.01) | |
| *G06Q 10/06* | (2012.01) | |
| *G06Q 10/00* | (2012.01) | |
| *G06Q 10/10* | (2012.01) | |
| *G06Q 30/00* | (2012.01) | |

(52) U.S. Cl.
CPC ............. *H04L 67/22* (2013.01); *G06Q 10/00* (2013.01); *G06Q 10/06311* (2013.01); *G06Q 10/1093* (2013.01); *G06Q 30/00* (2013.01)

(58) Field of Classification Search
CPC .......... G06Q 10/06311; G06Q 10/1093; H04L 67/22
USPC ................. 709/202–203, 204–206, 223–224
See application file for complete search history.

(56) References Cited

U.S. PATENT DOCUMENTS

| | | | | |
|---|---|---|---|---|
| 9,614,880 | B1* | 4/2017 | Davis | H04L 67/26 |
| 9,794,359 | B1* | 10/2017 | Lessin | H04L 67/22 |
| 9,942,334 | B2* | 4/2018 | Giacobbe | H04L 67/22 |
| 2009/0222557 | A1* | 9/2009 | Rudy | H04L 67/22 |
| | | | | 709/224 |
| 2009/0307196 | A1* | 12/2009 | Shuster | H04L 67/22 |
| | | | | 709/204 |
| 2011/0106892 | A1* | 5/2011 | Nelson | G06Q 10/109 |
| | | | | 709/206 |
| 2014/0006388 | A1* | 1/2014 | Yeskel | G06Q 30/02 |
| | | | | 707/723 |

(Continued)

OTHER PUBLICATIONS

"Office Action Issued in Chinese Patent Application No. 201480007010.6", dated Aug. 21, 2019, 5 Pages.

(Continued)

*Primary Examiner* — Bharat Barot
(74) *Attorney, Agent, or Firm* — Rainier Patents, P.S.

(57) ABSTRACT

The description relates to activity graphs. One example can obtain details from multiple activity cards. The example can identify relationships between at least some of the details of the multiple activity cards. The example can also generate an activity graph that reflects at least some of the relationships between individual activity cards.

20 Claims, 14 Drawing Sheets

(56) References Cited

U.S. PATENT DOCUMENTS

| | | | |
|---|---|---|---|
| 2014/0019457 A1* | 1/2014 | Xie | G06F 16/2228 |
| | | | 707/741 |
| 2015/0262249 A1* | 9/2015 | Wical | G06Q 30/0269 |
| | | | 705/14.55 |
| 2015/0326681 A1* | 11/2015 | Vaynblat | H04L 67/2823 |
| | | | 709/224 |
| 2015/0331914 A1* | 11/2015 | Cherukuri | H04L 67/22 |
| | | | 707/709 |

OTHER PUBLICATIONS

"Office Action Issued in Chinese Patent Application No. 201480007010.6", dated Mar. 7, 2019, 8 Pages.

* cited by examiner

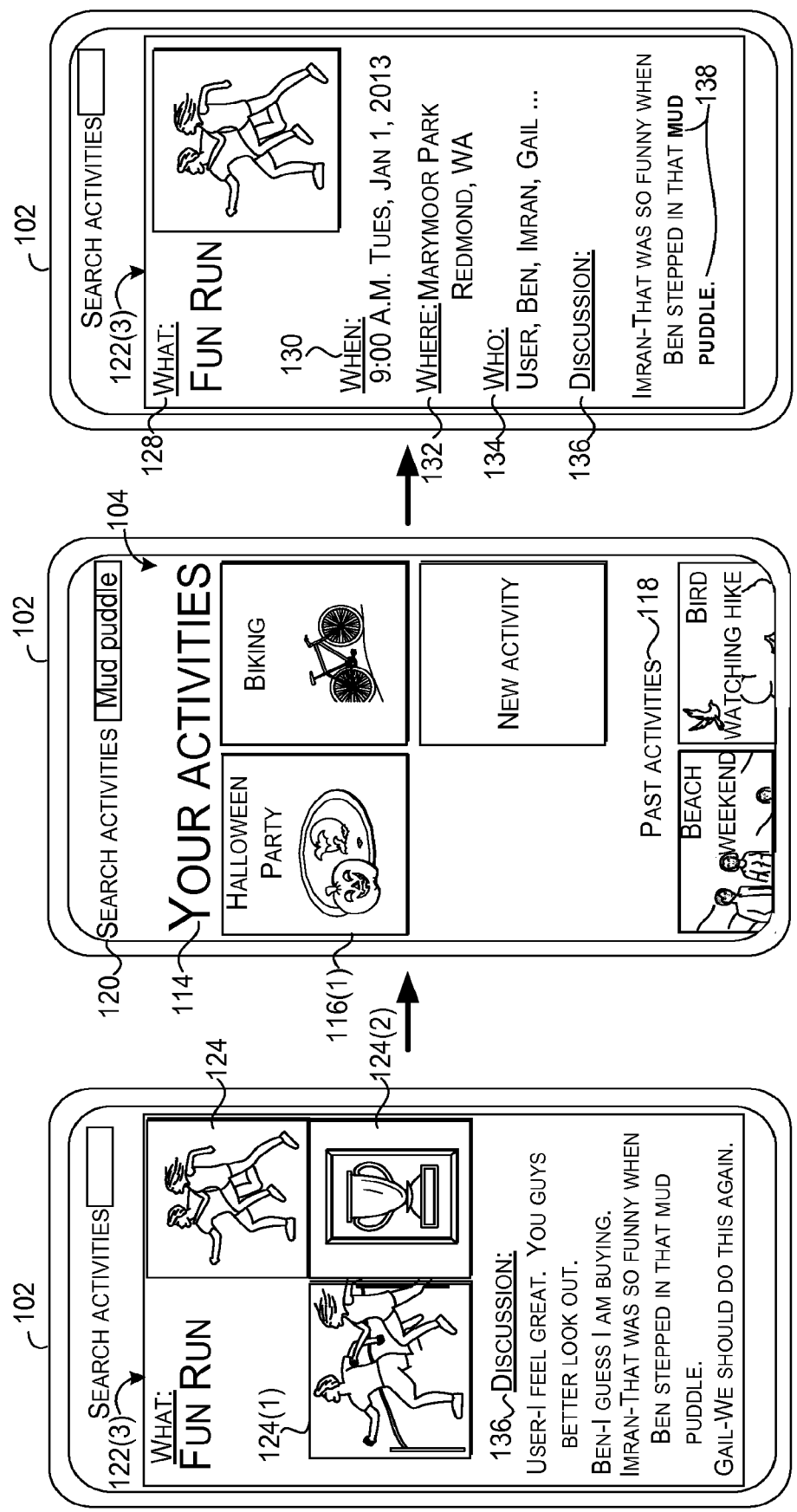

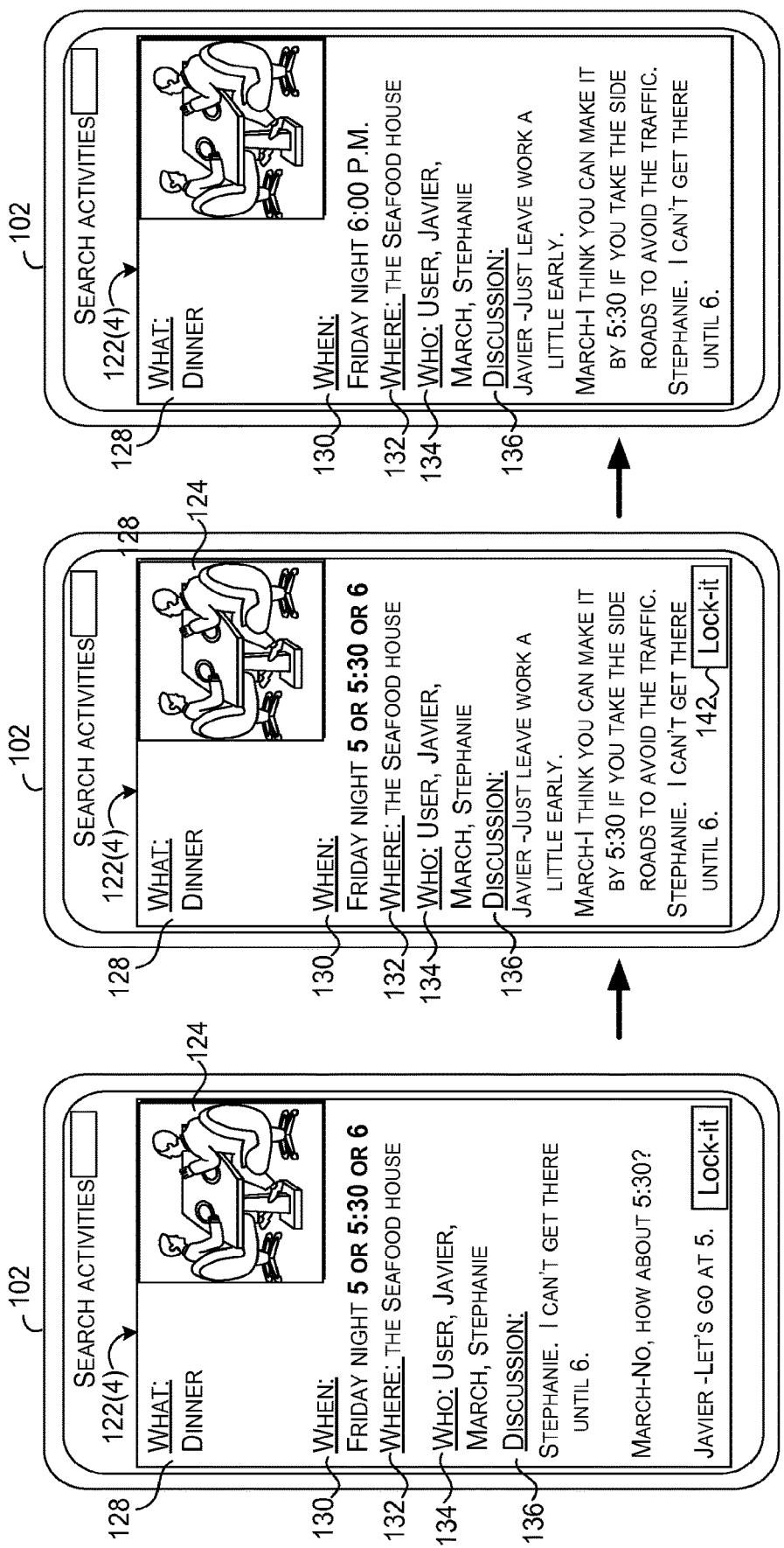

ACTIVITY CARDS

BACKGROUND

Consumers often use telephone calls, email, and short message service (SMS) to communicate and organize group activities, which can lead to fragmentation of information around an activity and make event details hard to find. For example, phone calls and SMS do not support group communications. Email can support group communications, but long threads can develop which can obfuscate details and whether the details are agreed upon. Accordingly, various participants may propose conflicting changes to the details of the activity, such that the activity is never actually agreed upon and/or there is confusion about the details of the activity. As such, the activity may never actually occur and/or participants may be inconvenienced by the confusion.

SUMMARY

The described concepts relate to activity cards and activity graphs. One example can receive user input relating to an activity. This example can generate an activity card based upon the activity. This example can populate the activity card with content derived from the user input. The example can also obtain additional user input that defines at least one recipient of the activity card. The example can further cause the activity card to be sent to the recipients.

Another example can obtain details from multiple activity cards. The example can identify relationships between at least some of the details of the multiple activity cards. The example can also generate an activity graph that reflects at least some of the relationships between individual activity cards.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

FIGS. 1A-1E and 2A-2C illustrate a computing device upon which activity card functionalities can be accomplished in accordance with some implementations of the present concepts.

DETAILED DESCRIPTION

Overview

This patent relates to activity cards and activity graphs. An activity card can make getting together with friends a snap. An activity card can float an idea as a digital postcard, use group chat to settle the details, and then share enjoyable moments with each other. An activity can be thought of as an expression of user interest with the intent of scheduling one or more events related to the activity. An activity can contain entities such as: participants, events, times, dates, places, lists, and/or media. An activity card can be thought of as containing static and/or dynamic details around an activity. An activity card can function as a data container that fosters agreement and discussion around an activity and can persist the activity card data before, during, and after the activity occurs.

Activity graphs can leverage the information from activity cards to surface useful data about entities, activities, and/or details. For instance, an activity graph can indicate what type of activities a particular user engages in and who the user does the activities with. In another example, an activity graph can indicate what types of activities occur at a particular location, such as a park. This data can be utilized in various ways. For instance, the data from the activity graph can be utilized to suggest other activity cards that may be of interest to the user.

The discussion below first describes examples of activity cards. The subsequent discussion relates to activity graph examples.

First Scenario Examples

Figure 1A:
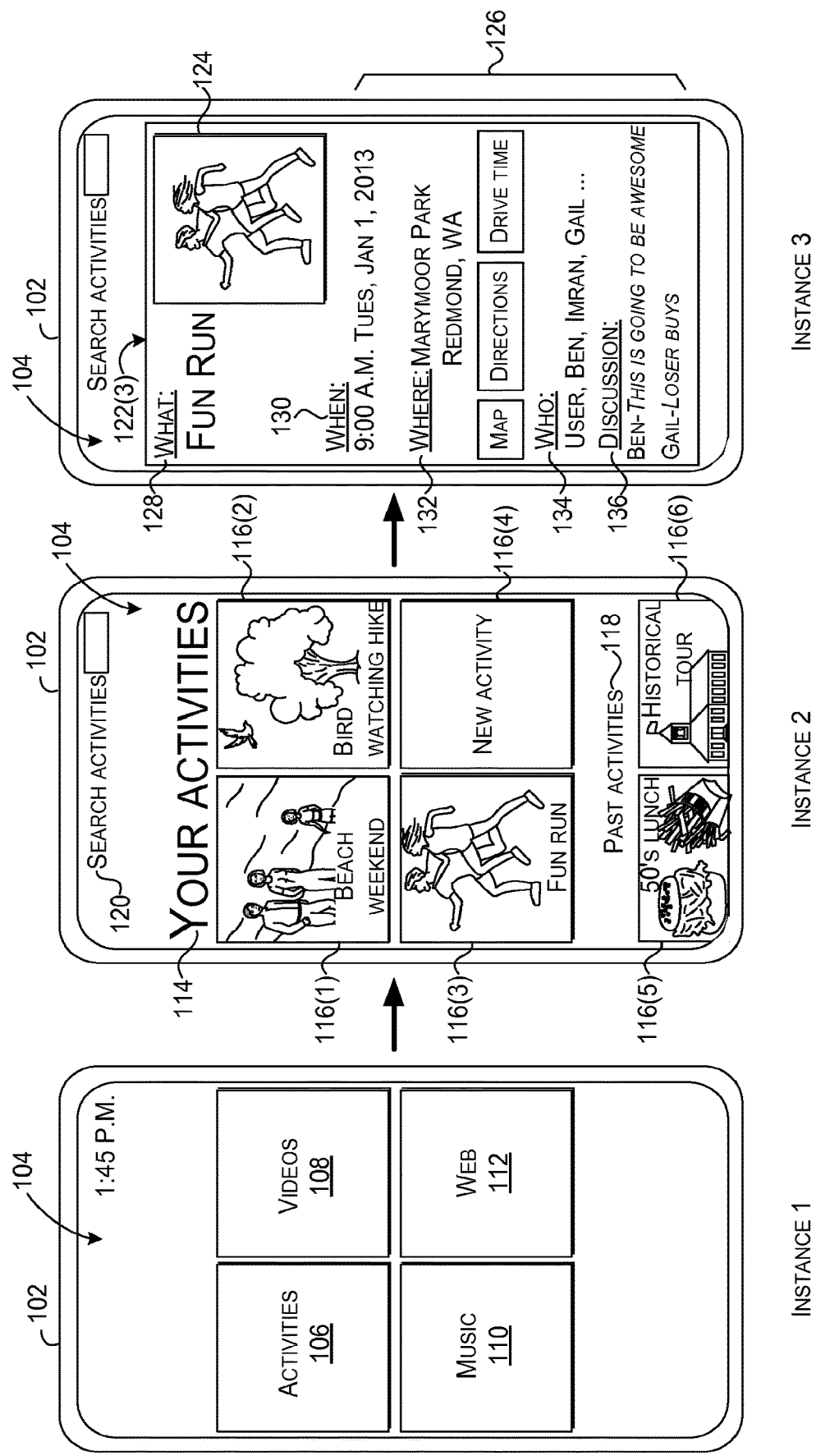
Figure 1B:
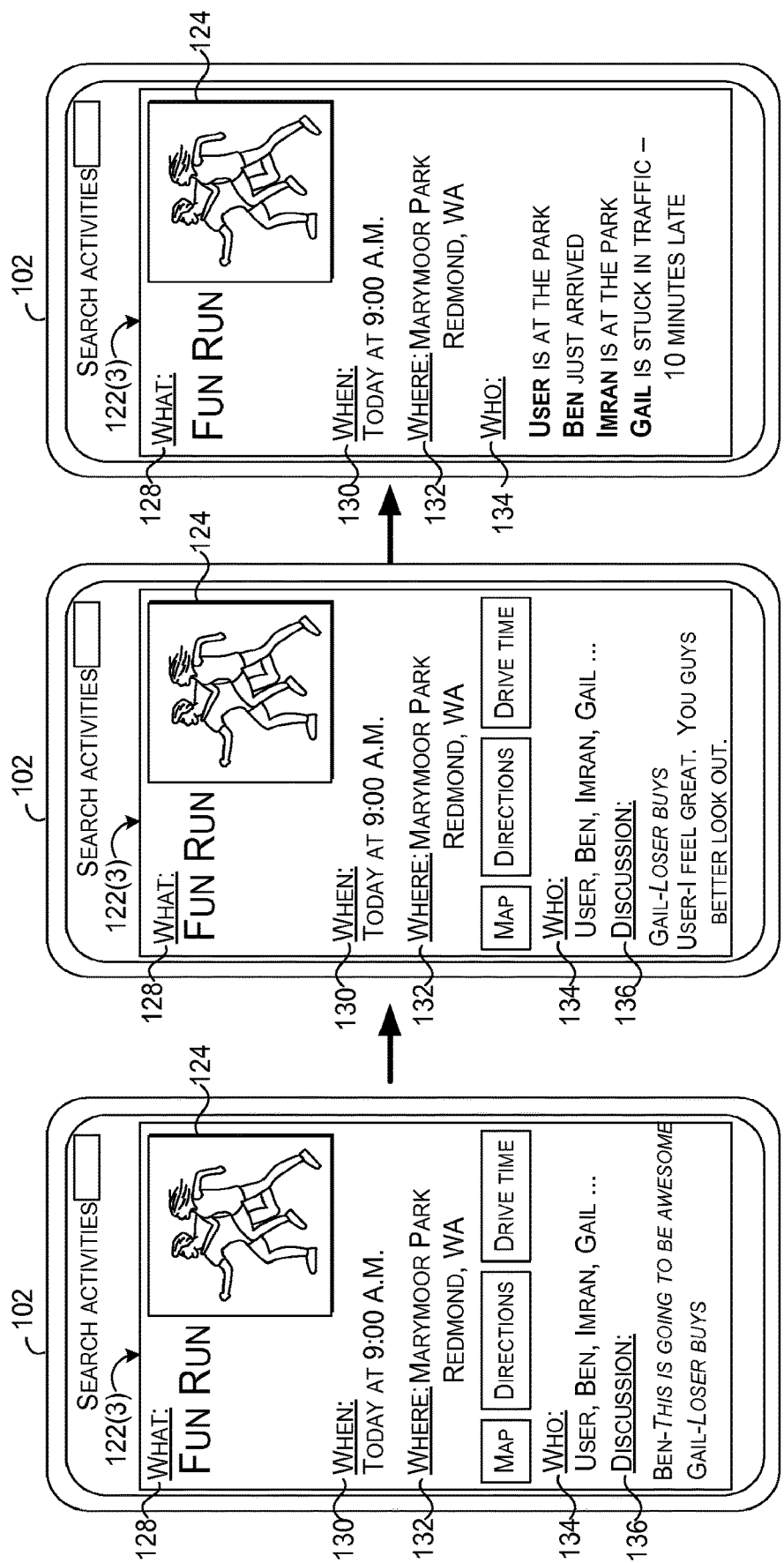
Figure 1D:
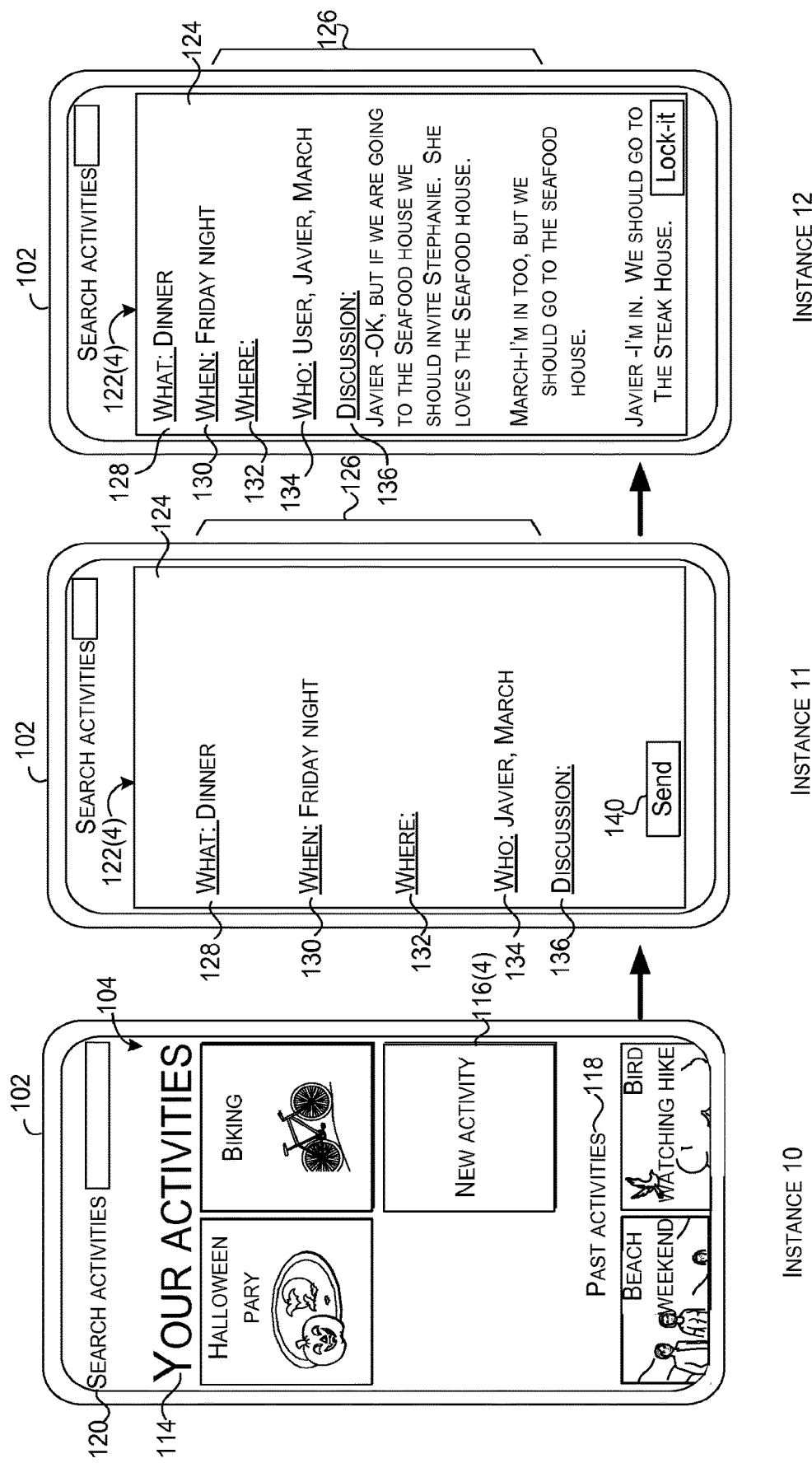

For purposes of explanation consider FIGS. 1A-1E which show a computing device 102 in several consecutive instances (e.g., FIG. 1A shows instances 1-3, FIG. 1B shows instances 4-6, FIG. 1C shows instances 7-9, FIG. 1D shows instances 10-12, and FIG. 1E shows instances 13-15). In this example, computing device 102 is manifest as a smart phone type mobile computing device that can present a graphical user interface (GUI) 104. However, the concepts apply to other types of computing devices, such as notebook computers, desktop computers, and/or tablet computers, among others.

In this example, the computing device 102 can provide multiple functionalities or features to the user. As illustrated in Instance 1, the features can include an activities functionality 106, a video functionality 108, a music functionality 110, and a web browsing functionality 112. Of course, the computing device can include alternative or additional functionality, such as a camera functionality and a phone functionality, among others. Assume for purposes of explanation that in Instance 1, the user has selected the activities functionality 106.

Instance 2 shows the computing device 102 responsive to the user selection related to Instance 1. In this case, the computing device is now displaying features relating to the activities functionality 106. For example, a "Your Activities" header 114 shows three existing activities for the user of the computing device 102. In this configuration, these activities can be represented as activity card previews 116. In this case, a first activity card preview 116(1) relates to a "Beach Weekend", a second activity card preview 116(2) relates to a "Bird Watching Hike", and a third activity card preview 116(3) relates to a "Fun Run". Further, the user can create a new activity card by selecting 'blank' activity card preview 116(4). (Viewed another way, 'blank' activity card preview 116(4) is not an activity card or an activity card preview, but instead is a convenient way for the user to start the process of creating a new activity card. This aspect is discussed below relative to FIG. 1D). In the present configuration the activity card previews 116 can be thought of as more compact versions of activity cards (illustrated in Instance 3). An activity card can be thought of as a data container that contains one or more types of data relating to an activity. In other configurations, the activity card preview and the corresponding activity card may be identical. Alternately, the activity card preview may be even more compact than the illustrated version. For instance, the activity card preview may be manifest only as text (e.g., "Fun Run").

A "Past Activities" header 118 shows activity card previews 116(5) and 116(6) which have already 'occurred' or been 'completed'. Of course, more activity card previews 116 can exist in either or both of the "Your Activities" header 114 and the "Past Activities" header 118. The user can view these non-visible activities in various ways. For instance, the user may scroll or swipe the screen to see other activities. Alternatively, the user may search activities as indicated at 120 to find a specific activity card/activity card preview. The user can search for the specific activity card using any data associated with the activity card. Examples of this data are described relative to Instance 8. At this point, assume for purposes of explanation, that the user wanted to view details relating to activity card preview 116(3) and as such selects that activity card preview.

Instance 3 illustrates an activity card 122(3) that corresponds to the user selection of activity card preview 116(3) described above. In this case, the activity card shows image 124 as well as more details 126 than the corresponding activity card preview since more of the GUI 104 is dedicated to the activity card than the activity card preview in Instance 2. In this case, the details 126 relate to "What", "When", "Where", "Who", and "Discussion", indicated generally at 128, 130, 132, 134, and 136, respectively. Of course, this is only one example of the details that can be included on an activity card. In this example the "When" 130 is listed as "9:00 A.M. Tuesday, Jan. 1, 2013", the "Where" 132 is listed as "Marymoor Park, Redmond, Wash.", the "Who" is listed as "User, Ben, Imran, Gail, . . . ", and the "Discussion" is listed as "Ben-This is going to be awesome" and "Gail-Loser buys". (Of course, the user's actual name or alias would appear in most implementations, but "user" is utilized for purposes of explanation). Of course, not all variations can be illustrated. For example, in another variation, the activity card may include detail headings such as "what", "where", "when", "who", and/or "discussion" among others. The user may then click to see content of a particular heading on a separate GUI. For instance, the user could click on the "discussion" heading to view discussion content, rather than having the discussion content visible on the same view as the other details. Of course, still other variations are also contemplated.

While Instance 3 represents a 'snap shot' of activity card 122(3), the activity card can be dynamic relative to time and/or content. For instance, assume that Instance 3 represents a view of activity card 122(3) as presented two weeks before the activity (e.g., the "Fun Run"). As the activity approaches, content of the activity card may change.

Note that alternatively, the activity card may be customized for each user (e.g., participant). Stated another way, various resources can be utilized to create and/or customize the activity card. Resources are described in more detail below relative to FIGS. 3-4. In the present example, assume that the user's daily commute passes a sporting goods store. The activity card could be temporally updated to show an advertisement from the sporting goods store indicating a running shoe sale. A caption could accompany the ad which says, "Get new running shoes for your upcoming run at Marymoor Park at the sporting goods store." Thus, the activity card content and/or images can be analyzed for information. This information can be utilized with various resources to provide useful information to the user.

A different variation of the activity card may be generated for other users. Assume for example, that Ben likes to have energy bars when he goes running. This aspect could be determined from analyzing Ben's text entries in activity cards and/or generally and/or from his Internet commerce ordering history, among others. As such, his activity card manifestation could include a note to remember to bring energy bars to the activity and/or an ad relating to energy bars. The ad could be based upon his expected travel, such as commute routes and/or route to the activity of the activity card.

Returning to the illustrated examples, subsequent views of the dynamic nature of the activity card are shown in Instances 4-6 of FIG. 1B. Instances 4-6 provide examples of changes that may occur. Of course, while this example is described relative to the user, other participants (e.g., the other people listed under the "Who" detail 134) can also view the same or a similar variation of activity card 122(3).

Instance 4 of FIG. 1B shows a subsequent view of activity card 122(3) on computing device 102. This example activity card is generated the morning of the activity (e.g., the "Fun Run") an hour before the activity (e.g., at 8:00 A.M.). In this case, the "When" detail 130 is updated to reflect that the activity is "Today at 9:00 A.M.". Assume that the user adds content to the discussion: "I feel great. You guys better look out."

The user's text is reflected in Instance 5. In order to add the new content to the discussion, earlier content may no longer be visible, but can be seen if the user 'scrolls' or otherwise moves through the discussion content. In this case, Gail's content remains visible, but Ben's is not. Note that the user can also get a map, directions, and/or current drive time as listed under the "Where" detail 132. These features may utilize personal data gathered about the user (in this case, the user's location as determined by the computing device). The user's privacy can be protected by only enabling this feature upon the user giving their express consent. Further, the user's information may be utilized only when the user requests a feature that utilizes the user's information. For instance, the user's location may not be tracked until the user asks for directions or current drive time. The tracking could cease when the user arrives at the event. If the user does not authorize personal information to be utilized, then a generic map and/or directions can be presented. The various implementations can be accomplished by first obtaining authorization from the user. All privacy and security procedures can be implemented to safeguard the user. Many of the described features can be accomplished even in the event that the user does not give authorization and thus no personal information is utilized.

Instance 6 shows a further example of the activity card 122(3) generated at 8:50 A.M. In this case, the "Who" detail 134 indicates that the "User is at the park", "Ben just arrived", "Imran is at the park", and "Gail is stuck in traffic—10 minutes late". Thus, the participants are provided with dynamic useful information. The status of each participant can be generated automatically. Alternatively, if the user declines use of their personal information, they can be queried about their status or allowed to provide it on their own.

Note that in another example, the activity card may be dynamically updated to remind the users (e.g., participants)

when to leave and what route to take to the activity. For instance, this version of the activity card could be presented to the users one to two hours before the activity and can be updated as traffic conditions change. Further, the activity card may include a visual and/or auditory alarm element to indicate to the user when it is time to leave for the activity. In such a case, the alarm can be specific to each of the individual users based upon their location, travel route, and mode of travel, among others.

FIG. 1C shows subsequent views (Instances 7-9) after the fun run activity. Instance 7 shows pictures 124(1) and 124(2) of the fun run added to the activity card 122(3). Further discussion 136 added after the activity is also evident. This configuration allows all the data associated with the activity, from creation of the activity card to perpetuity, to be persisted by the activity card. This data can include the text, images, maps, directions, GPS coordinates, etc., associated with the activity card.

Assume for purposes of example that at a later date, say two years later, the user remembers an activity where someone stepped in a mud puddle, but cannot otherwise remember the details. As indicated in Instance 8, the user can enter "mud puddle" in the search activities field 120. The activities can be searched based upon the user entry.

Instance 9 shows a subsequent view of the computing device where activity card 122(3) is once again displayed responsive to the user search. In this case, the "What", "When", "Where", "Who", and "Discussion" details 128-136 are provided for the user along with image 124. The user's search entry is illustrated in "bold" for the user at 138. The user can scroll through the images and/or text to see additional information about the activity. Thus, the activity card provides a new type of data container centered around an activity that can be persisted for the user indefinitely. The activity card can be processed or analyzed using various technologies, such as machine learning, natural language processing, optical character recognition, etc., to garner useful data from the activity card. This useful data can allow a multitude of resources to be utilized to provide features relative to the activity card. Examples of these features are described above and below.

Note that an activity card can function as a resource for suggesting, generating, and/or autopopulating details of other activity cards. Stated another way, if a user engages in an activity, the user is likely to engage in other similar activities. Thus, existing activity cards can be analyzed to determine further activity cards that may be of interest to the user. In such a case, the more activity cards the user utilizes, the quality of the activity cards as a resource increases (e.g., the understanding of the user tends to increase the more the user utilizes activity cards). The information garnered from the activity cards can be integrated with other resource information, such as calendars, contacts, and web search history, among others, to provide features that aid the user(s).

For example, if the user has participated in several activity cards relating to park league soccer games and practices, information can be gathered from the web about upcoming park league soccer activities. This information may be used to autogenerate a new activity card (e.g., proposed activity card) that can be presented to the user to accept or decline. Alternatively, the information can be utilized to suggest to the user that he/she may want to generate an activity card for an upcoming park league soccer activity. In one case, a new activity card can be generated and invitees can be suggested from the earlier park league soccer activity cards. Further, the user's calendar and/or the calendar of the other invitees can be examined to find openings and/or preferences (e.g., your calendar is open in the mornings before work and your past activity cards indicate that you prefer scheduling soccer practice before work. Further, you might want to invite these people and this soccer field can be reserved in the morning at this time). Specific activity card generation examples are described below.

Returning to the illustrated examples, FIG. 1D relates to creating a new activity card. Assume for purposes of explanation that the user now wants to create a new activity card. One way of creating an activity card is shown at Instance 10. In this case, the user can select the new activity card feature 116(4).

Instance 11 shows a new activity card 122(4). The user has initially added some details 126 to the activity card. For instance, the user has added "Dinner" to the "What" detail 128, "Friday night" to the "When" detail 130, and "Javier", and "March" to the "Who" detail 134. The user can then click "Send" at 140. Note that the user can generate the activity card 122(4) without completing all of the detail fields. In this example, the details do not include a location (e.g., "Where" detail 132). As will be explained below, additional details can be added subsequently as the activity card evolves.

Instance 12 shows the activity card 122(4) that is generated responsive to the user selection in Instance 11. The activity card 122(4) can be sent to (or accessed by) those indicated in the "Who" detail as well as the user. In this implementation the user is automatically populated into the "Who" detail as an invitee. Instance 12 also shows that the invitees are adding further content to the activity card via the "Discussion" detail 136. In this case, the content is shown with the newest on top. Thus, the first comment in the "Discussion" is from Javier. Javier stated, "I'm in. We should go to The Steak House." March then indicated, "I'm in too, but we should go to The Seafood House." Javier then replies, "OK, but if we are going to The Seafood House we should invite Stephanie. She loves The Seafood House."

Note that while not shown, the activity card could be automatically populated with content to help the users make a decision regarding one or more of the details. For instance, the discussion could be analyzed using natural language processing. Based upon the information obtained from the activity card by the natural language processing, menus, images, reviews, and/or ads from 'The Seafood House' and 'The Steak House' could be offered to and/or displayed for the users.

Returning to the illustrated examples, FIG. 1E includes Instances 13-15 which continue the scenario introduced relative to Instances 10-12. Instance 13 includes an updated view of activity card 122(4). The activity card includes an updated "Where" detail 132 that indicates "The Seafood House". Further, the "Who" detail now includes "Stephanie". An image of The Seafood House is also shown at 124. Stated another way, the content of the activity card, in this case the discussion, can be analyzed, such as utilizing natural language recognition/processing, and/or various machine learning resources. The content can be utilized to enhance the activity card. In this case, the activity card is enhanced in that an invitee is added automatically without any additional effort from the users. Further, the location (e.g., "Where:") is automatically updated based upon the analysis of the discussion.

In some implementations, content can be added manually by one of the invitees. In other implementations, the right to add content to the details 128-134 can be reserved for the originator of the activity card 122(4) (e.g., the user in this case). In still other implementations, the content can be added automatically from the content in the "Discussion" detail 136. Further, while not expressly shown, some implementations can automatically present additional content on the activity card to help drive consensus. For example, during the discussion about which restaurant to go to, menus, reviews, coupons, advertisements, and/or images from The Steak House and The Seafood House could be automatically presented or linked on the activity card to help the participants agree on the location. Information about the selected restaurant (e.g., "The Seafood House") could be persisted on the activity card 122(4). Further, prior activity cards associated with The Seafood House could be analyzed. For instance, the present activity card could be populated with a snippet from the user from the last time he/she went to The Seafood House. For instance, the snippet might include a quote added to a prior activity card discussion where the user said, "I love The Seafood House. We should go there more often." This can be useful information that can help guide the user's decision this time whether to go to The Seafood House.

Returning to the illustrated examples, note that Instance 13 reflects ongoing dialog in Discussion 136 about the time on Friday Night. Javier initially said, "Let's go at 5." March responded, "No, how about 5:30?" Finally, Stephanie said, "I can't get there until 6." These possible times are indicated in the "When" detail 130. Also, to draw attention to the fact that this detail is undecided, the times in the "When" detail 130 are shown 'bold' to contrast them from other 'decided' or 'agreed upon' details which are shown in 'normal' font.

The above example discussion or 'group chat' is one way that activity card details can be settled. An alternative way to settle activity card details can be through 'consensus scheduling' or 'consensus polling'. Consensus polling can list details such as times, dates, places, etc., as options and invitees vote upon their preferences. Individual details can be selected based upon vote count. The activity card can also provide other tools to reach consensus. For instance, the activity card could include 'call' and/or 'video chat' icons. During the negotiation, a user could simply click one of these icons to be automatically connected to the other users that are engaging in the discussion. The users could negotiate 'in person'. An agreement could be added to the card by the users. Alternatively, voice recognition resources could be applied to the conversation and the agreement could be automatically populated onto the activity card.

Returning to the present example, Instance 14 shows continuing dialog about the time aspect. Javier said, "Just leave work a little early." March added, "I think you can make it by 5:30 if you take the side roads to avoid the traffic." Assume that the dialog continued until the time of the activity was approaching. At this point a "lock-it" feature can be utilized to finalize any undecided details. In some implementations, the "lock-it" feature can initiate automatically as the activity approaches. In other implementations, any of the invitees can activate the "lock-it" feature. In still other implementations, only the originator of the activity card 122(4) (e.g., the user) can activate the "lock-it" feature. Assume in this example, that the user activated the "lock-it" feature as indicated at 142. For instance, the user might activate the "lock-it" feature at 2:00 P.M. on Friday so that everyone could finalize their plans for the afternoon.

As mentioned above, in some implementations, the undecided details can be decided automatically on behalf of the participants. In other cases, the invitee who activates the "lock-it" feature may be queried to decide the details. In still other implementations, the results of the consensus polling can be autopopulated in the activity card.

Instance 15 shows the activity card 122(4) presented after the user selected the "lock-it" feature at Instance 14. In this case, the "When" detail 130 now reads 6:00 P.M. and is not 'bolded' since it is now decided. In this case, the time was also automatically formalized from the more basic user entries (e.g., "6" to "6:00 P.M.", these values can be viewed as semantic equivalents). In summary, the features described above relative to Instances 10-15 allow a user to create an activity card without providing all of the details. Details can be added through the input of the various participants of the activity card. The "lock-it" feature provides an example of one of the features that allow resolution of any unresolved details.

Second Scenario Examples

Figure 2A:
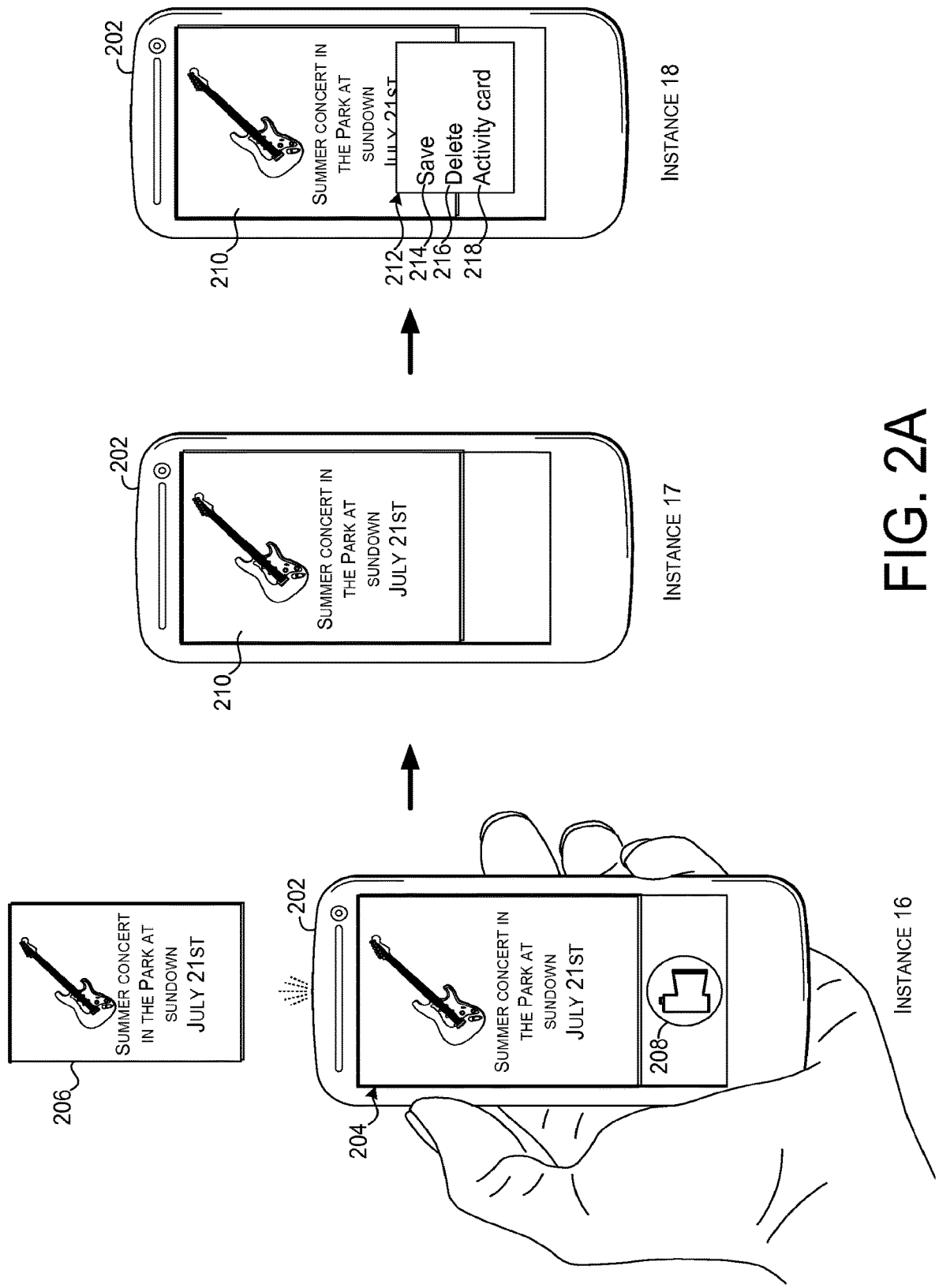
Figure 2B:
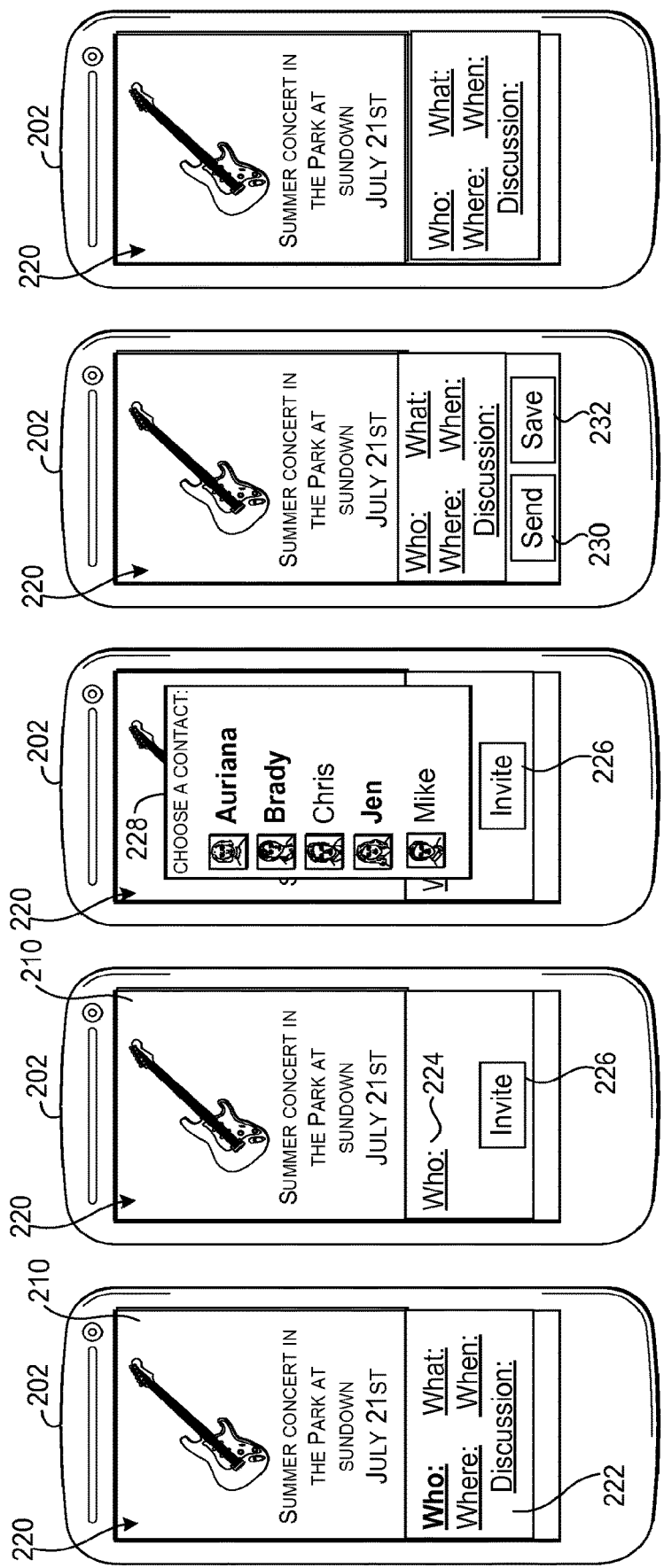
Figure 2C:
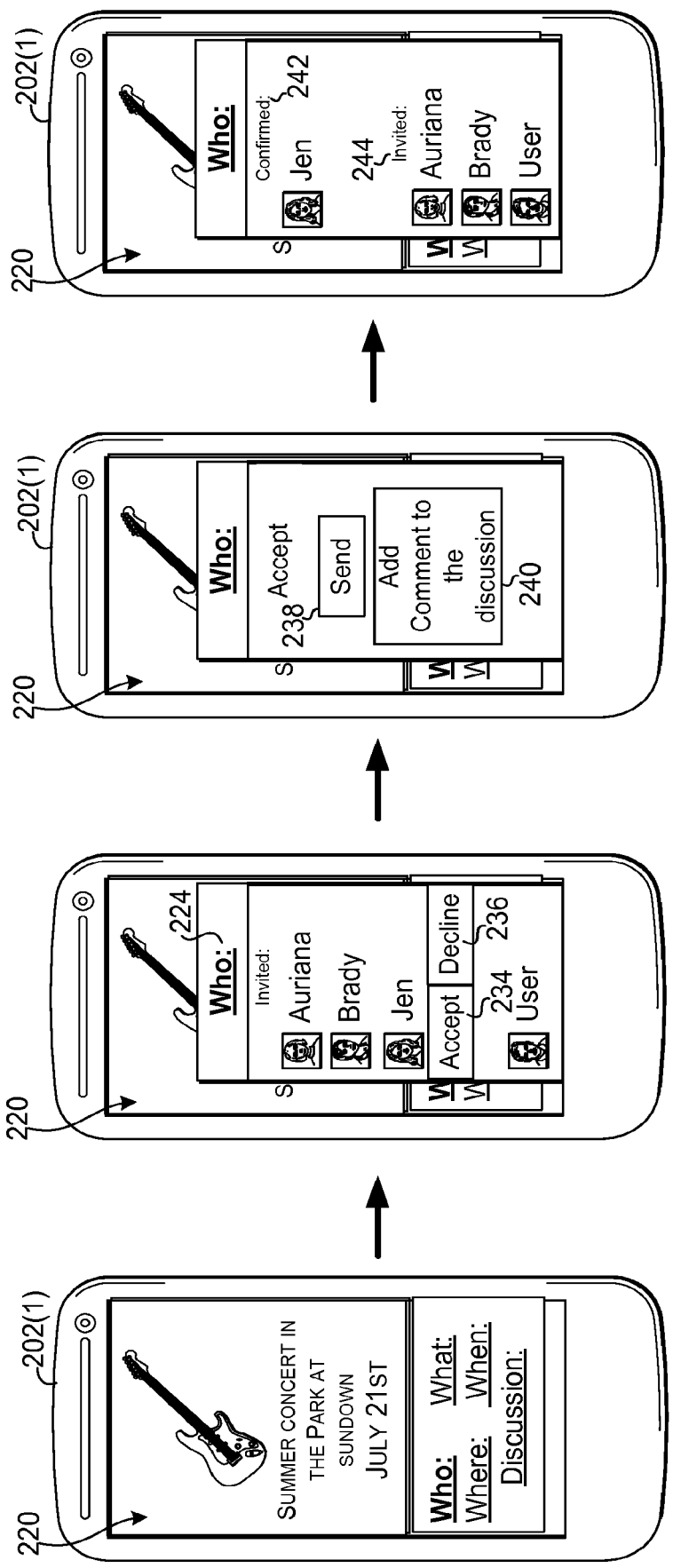

FIGS. 2A-2C show another computing device 202 that is similar to computing device 102 described above relative to FIGS. 1A-1E. Computing device 202 can present a GUI 204 that relates to activity cards. In this case, FIG. 2A shows Instances 16-18, FIG. 2B shows Instances 19-23, and FIG. 2C shows Instances 24-27.

Beginning with Instance 16, assume for purposes of explanation, that the user sees a flyer 206 for a concert. The user decides it might be fun to go to the concert. The user takes a picture of the flyer. In this case, the user takes the picture by selecting the camera icon on the computing device at 208.

Instance 17 shows the resultant picture 210 of the flyer. At this point, the user can select to convert the picture into an activity card. For instance, the user could use voice or gesture commands to launch the activity card feature. In this case, assume that the user taps a touch-sensitive display of the computing device.

Instance 18 shows a dialog box 212 generated responsive to the user tap of Instance 17. The dialog box allows the user to save the picture option at 214, delete the picture option at 216, or create an activity card option at 218. Assume that the user taps to create the activity card. The resultant activity card is shown in FIG. 2B.

Starting at Instance 19, FIG. 2B shows an activity card 220 that includes picture 210 and details 222. The listed details include "Who:", "What:", "Where:", "When:", and "Discussion:". Some implementations can utilize various techniques to derive information from the picture to populate the activity card 220. For instance, these implementations can apply optical character recognition (OCR) techniques to the picture to obtain text corresponding to the text in the picture. Natural language processing/natural language generation (NLP/NLG) techniques can use this text to populate the details of the activity card. For example, the date from the picture can be added to the "When:" detail. Alternatively or additionally, the text derived from the picture can be used as search terms of a search query to find additional information. For instance, utilizing "Summer concert in the park at sundown July 21$^{st}$" could yield search results that provide additional details about the event. For instance, the search results may yield a website belonging to organizers of the event.

Further, the text information may be used in combination with other information from the picture to obtain the further information. For instance, metadata associated with the picture may indicate the GPS coordinates where the image was obtained. This location information, in combination with the text information, may yield more precise search results (e.g., avoid linking to search results for a similar event on the same day at a park in another city). Further, this information can be utilized to gather additional information that can be made available on the activity card. For instance, the weather forecast can be obtained for the location on that date. If the date is relatively distant, say more than a week, the average daily temperature for that location on that date can be provided.

Further, because natural language processing can be utilized on the data, additional details can be provided for the user. For example, the natural language processing can determine the meaning of 'sundown' (e.g., that the concert starts at sundown). With that knowledge, a resource can be accessed that indicates what time sundown occurs at that location on that date. The time could then be populated in the "When:" detail. In another example, the search could produce music from the artists that are performing at the concert. The music could be attached to the activity card in a manner that it automatically plays for the user or plays upon user selection.

In the present case, assume that the user selects the "Who:" detail as indicated by the 'bold' appearance in the details 222. Instance 20 shows the "Who:" detail at 224 and retains the picture 210 of the activity card 220. In this case, no one has been invited yet, so the "Who:" detail does not contain any invitees. However, the user can select an invite option 226.

Instance 21 shows the activity card 220 with the user's contacts list 228. The contacts list can be a contacts list that is locally stored on computing device 202 and/or a global contacts list that is remotely stored, such in cloud-based resources. The user can select invitees from the contact list. In this case, assume that the user selected "Auriana", "Brady", and "Jen" as indicated by the 'bold' text. The user can then select the invite option 226 to configure the activity card.

In some instances an individual recipient may be associated with multiple phone numbers and/or multiple email addresses in the contacts list. The user can specify an individual phone number and/or individual email address to send the activity card. In other instances, the selection can be performed automatically. In some of these cases, the selection can be performed automatically and then presented to the user for approval. In one such example, email history and/or activity card history can be utilized to identify contacts for the user. For instance, the people that the user communicates (e.g., emails or texts, among others) often (or the most) may be suggested to the user. In another variation, the people that the user emails the most about a particular topic (e.g., music, concerts, and outdoor concerts, among others) may be suggested to the user. This information could be obtained from email history, text history, and/or previous activity cards, among other sources.

Instance 22 shows the resultant activity card 220. The user can select to send the activity card at 230 or save the activity card at 232. Assume that the user selects to send the activity card.

Instance 23 shows a resultant activity card 220 that is sent to or viewable by the user and the other invitees.

Instance 24 of FIG. 2C shows another view of the activity card 220. Assume for purposes of explanation, that this view is on invitee Jen's computing device 202(1). Assume further that Jen selects the "Who:" detail as indicated in "bold".

Instance 25 shows further aspects of the "Who:" detail 224. In this example, the "Who:" detail is superimposed over a remainder of the activity card 220. In other cases, more of the remainder of the activity card may be visible while specific details are viewed, or alternatively the remainder may be totally obscured. In this case, the details are customized for the viewer (e.g., Jen) so that the viewer can either accept or decline as indicated at 234 and 236, respectively. Assume in this case that Jen accepts at 234 (e.g., an invitee accepts and becomes a participant).

Instance 26 shows another instance of the activity card 220 generated responsive to the acceptance. This version allows Jen to "Send" the acceptance at 238 or "Add comment to the discussion" at 240. Assume that Jen selects "Send" at 238.

Instance 27 shows a subsequent view of the "Who:" detail that can be viewed by Jen or any of the invitees. This view distinguishes confirmed invitees (e.g., participants) at 242 from the invitees who have not yet responded at 244. While not expressly shown, invitees who decline can be distinguished in a similar manner.

In summary, the activity card concepts described above can enable individuals or family coordinators to plan social activities, get details to participate in an activity and quickly agree on when and where. Stated another way, these activity card concepts can enable users to float an idea and discuss it with each other. Thus, users can discover new things to do with one another. The activity card can be automatically updated to provide the latest details and can be accessed from anywhere. The activity card can also include beautiful content that can enhance the user experience. Further, the activity card can be integrated with, or augmented by, various resources to enhance the functionality offered by the activity card.

First System Examples

Figure 3:
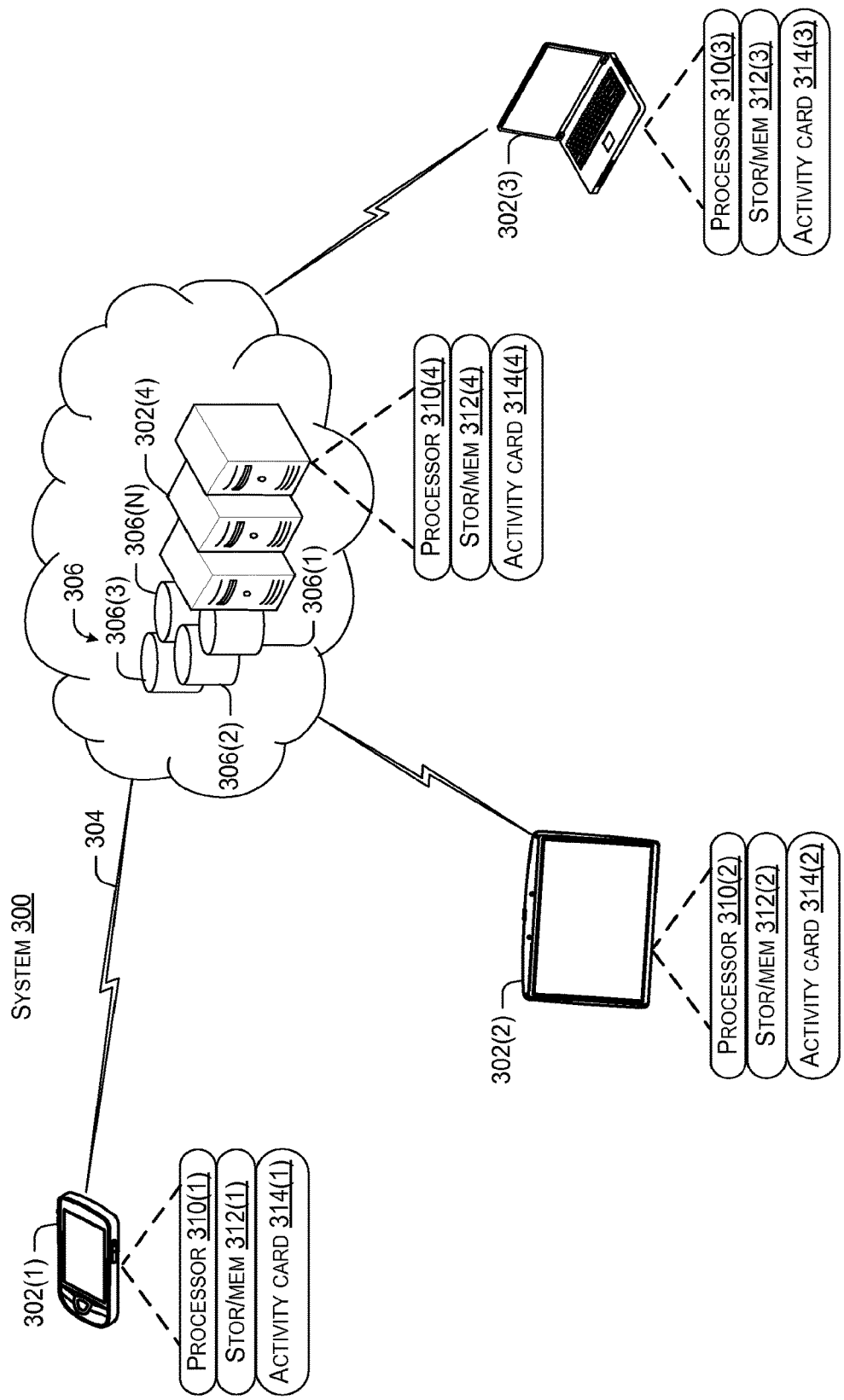
FIGS. 3-4 illustrate examples of systems upon which activity card functionalities can be accomplished in accordance with some implementations of the present concepts.

FIG. 3 shows system 300 that can enable the activity card concepts described above. In this example, the system 300 includes several devices 302. In this case, the devices are manifest as a smartphone type computer 302(1), a pad type computer 302(2), a notebook type computer 302(3), and a set of cloud-based server type computers 302(4). Smartphone type computer 302(1) is similar to devices 102 and 202 described above relative to FIGS. 1A-1E and 2A-2C, respectively. (In this discussion, the use of a designator with the suffix, such as "(1)", is intended to refer to a specific device instance. In contrast, use of the designator without a suffix is intended to be generic). Of course not all device implementations can be illustrated and other device implementations should be apparent to the skilled artisan from the description above and below.

The devices 302 can communicate over one or more networks 304 (represented by 'lightning bolts'). The devices can also communicate with resources 306. Non-limiting examples of resources can include a global contacts/calendaring service 306(1), enterprise directory service 306(2), search engine 306(3), and monetization engine 306(N). Other non-illustrated examples of resources can include optical character recognition technologies, natural language processing/generating technologies, and/or activity card database, among others. In some cases, the present concepts can be implemented by an individual device 302 acting in isolation. In other cases, a device can implement the present concepts by operating cooperatively with one or more other devices and/or the resources 306. These variations are described in more detail below.

Devices 302 can include several elements which are defined below. For example, these devices can include a processor 310, storage/memory 312, and/or an activity card component 314. The devices can alternatively or additionally include other elements, such as input/output devices (e.g., touch, voice, and gesture), buses, graphics cards, Wi-Fi circuitry, cellular circuitry, positional circuitry (absolute location (e.g., GPS) and/or relative location (accelerometers, magnetometers, among others) etc., which are not illustrated or discussed here for sake of brevity.

The term "device", "computer", or "computing device" as used herein can mean any type of device that has some amount of processing capability and/or storage capability. Processing capability can be provided by one or more processors (such as processor 310) that can execute data in the form of computer-readable instructions to provide a functionality. Data, such as computer-readable instructions, can be stored on storage, such as storage/memory 312 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as personal computers, desktop computers, notebook computers, cell phones, smart phones, personal digital assistants, pad type computers, mobile computers, cameras, or any of a myriad of ever-evolving or yet to be developed types of computing devices. A mobile computer can be any type of computing device that is readily transported by a user and has a self-contained power source (e.g., battery). Aspects of system 300 can be manifest on a single device or distributed over multiple devices.

In the illustrated implementation devices 302 are configured with a general purpose processor 310 and storage/memory 312. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

In some configurations, the activity card component 314 can be installed as hardware, firmware, or software during manufacture of the device 302 or by an intermediary that prepares the device for sale to the end user. In other instances, the end user may install the activity card component 314, such as in the form of a downloadable application. Further, in some instances individual devices 302 can include robust activity card components. In other cases individual devices may have less robust or thin activity card components where a majority of the functionality is performed by other devices, such as cloud based devices, for presentation on the thin device. In some cases, the local device can provide a web-view of content generated remotely, such as by the cloud based devices.

Stated another way, in some implementations, an individual device, such as device 302(1) may have a less robust instance of the activity card component 314 such that some or all of the functionality provided by the activity card component 314(1) is performed remotely, such as at cloud-based device 302(4) and communicated back to device 302(1) for presentation to the user. Further, the activity card component may include individual resources 306 or access individual resources. For example, the activity card component may include a natural language processing/generation resource or may access a remote natural language processing/generation resource.

The activity card component 314 can communicate the activity card to the invitees using any available technology, such as email or text. In some cases, the activity card may not be communicated to the invitees. Instead, the invitees may receive a link to access the activity card.

The activity card component 314 can be a freestanding application or the activity card component can be an element of a contact management application or a calendaring application, among others. Examples of contact management applications can include Outlook® from Microsoft® Corporation, Apple Contacts™, and/or Google Gmail™.

Alternatively or additionally to being an element of a contact management application or a calendaring application, activity card component 314 can generate and/or present activity cards. The activity card component can integrate the activity cards with the resources 306. For example, the activity card component can utilize the resources 306 to determine likely invitees for a user who is initiating an activity card. The activity card component can communicate with the global contacts/calendaring resource 306(1) and/or the enterprise directory service resource 306(2) to identify dates and times when the user and the invitees are available. The activity card component can utilize the search engine resource 306(3) and/or the monetization engine resource 306(N) to identify content to populate the activity card and/or to identify other activity cards that may be of interest to the user. For instance, in the 'the sporting goods store' example described above, the sporting goods store may make an arrangement with the monetization engine to put an ad in the activity card. Alternatively or additionally, the sporting goods store may arrange to generate an activity card about its own weekly fun run and invite the user to the store's fun run based upon the user's other activity cards (e.g., the fun run described above relative to FIGS. 1A-1C).

Activity card component 314 can be configured to cause a GUI to be presented to a user on the user's computing device. Examples of activity cards are described in detail above. Briefly, the activity card can include content provided by the user. The activity card component can alternatively or additionally autopopulate the activity card with content derived from the user content. For instance, the activity card component can use the user entered content, such as a photograph, metadata, and/or an activity name as search terms to obtain additional information from resources 306. The activity card component can be configured to allow recipients of the activity card to negotiate details of the activity card. Further, in some implementations, the activity card component can enable a feature that is configured to stop the negotiation and lock the details. In some implementations, the activity card component can also generate activity cards that the user may be interested in based upon an analysis of the user's data. Further still, the activity card component can identify activity cards that the user may be interested in and present them to the user. Several of these aspects are described above and below by way of example.

In various implementations, the activity card component 314 can enable users to schedule and discover everyday events with the simplicity of SMS, yet provide additional benefits such as: float ideas, support group chat, create beautiful invitations, support negotiations, and polling. The activity card component can enable a group to plan and communicate around topics of interest in a fun way. The activity card component can discover activities based on location and interests. For instance, the activity card component can recognize details, such as when, where, and/or who and provide intelligence through tools such as weather, maps, traffic, places, and tips that make the event organization and participation experience more enjoyable. The activity card component can provide a way to negotiate details, such as when and/or where, through social banter.

The activity card component 314 can provide details and notifications to help the user do an activity, including the ability for a user to indicate whereabouts. In some cases, the activity card component can be integrated with the calendar solution that users use on a daily basis (e.g., Outlook® brand calendaring product from Microsoft® Corp.). The activity card component can provide a way to personalize information for participants through notes and photos. It can also provide a way for users to share activity information with others easily, i.e. friends, significant other, family, etc.

Second System Examples

Figure 4:
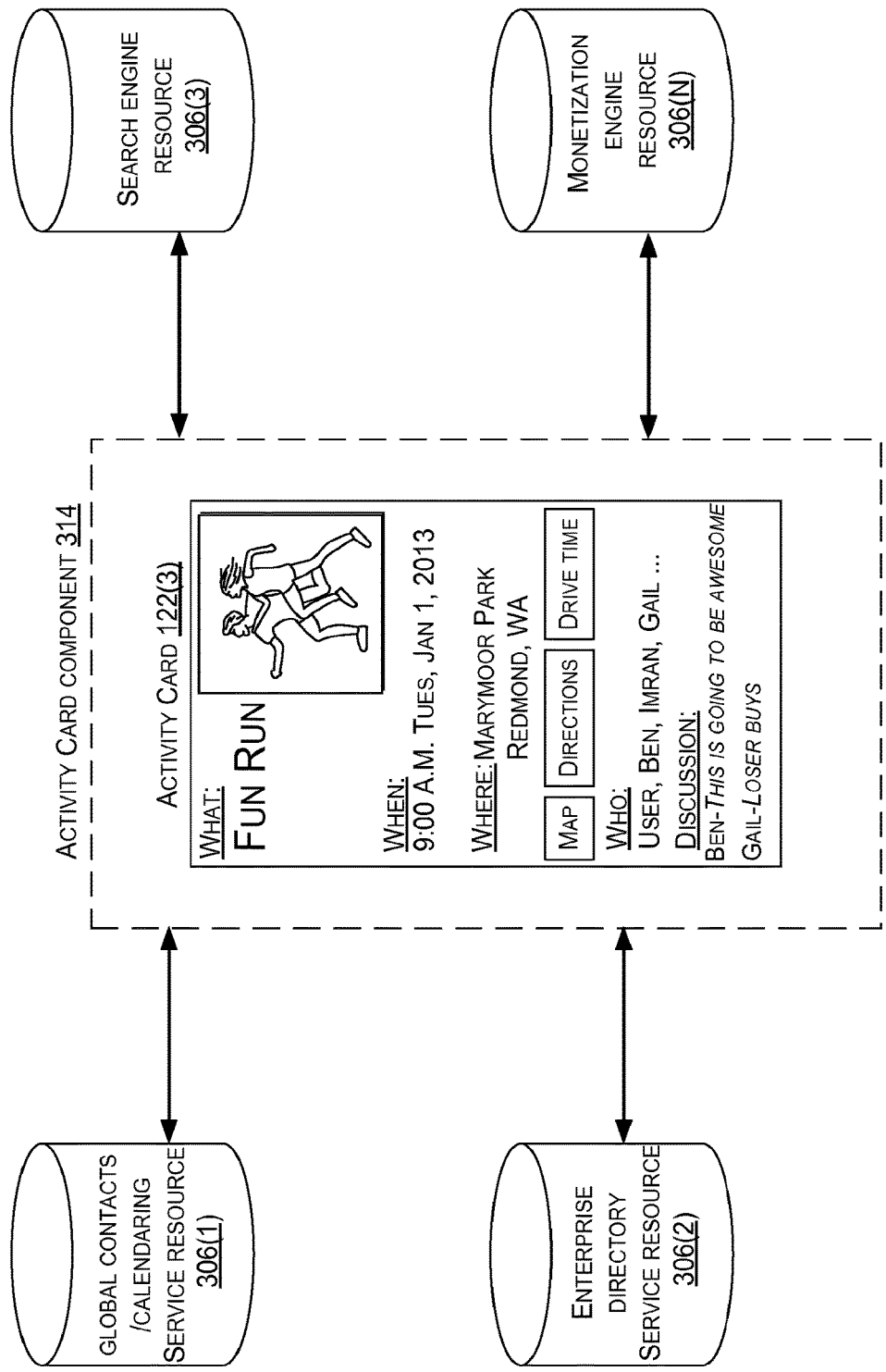

FIG. 4 shows system 400 that can enable the activity card concepts described above. In this example, the system 400 includes activity card 122(3). The activity card can be generated and/or refined by activity card component 314 utilizing resources 306. The resources can be local or remote relative to the activity card component. The activity card component can utilize individual resources to obtain data related to an activity card that can then be leveraged with other resources. For instance, the activity card component can utilize a natural language processing resource to analyze content on the activity card, such as the user discussion. The activity card component can then utilize the output of the natural language processing resource to facilitate a meaningful search utilizing the search engine resources. The activity card component can then populate some of the search results on the activity card.

Alternatively or additionally, the activity card component 314 could supply the output of the natural language processing and/or the search results to the monetization engine resource to obtain a germane ad that the activity card component can then populate on the activity card. The activity card can provide a persistent data container related to an activity of interest to the user. The activity card component 314 can integrate the resources into creation and customization of the activity card to enhance the user experience. Further, the activity card and/or information from the activity card can be utilized by the resources as a source of information that can be useful to the resource.

First Activity Graph Examples

Figure 5:
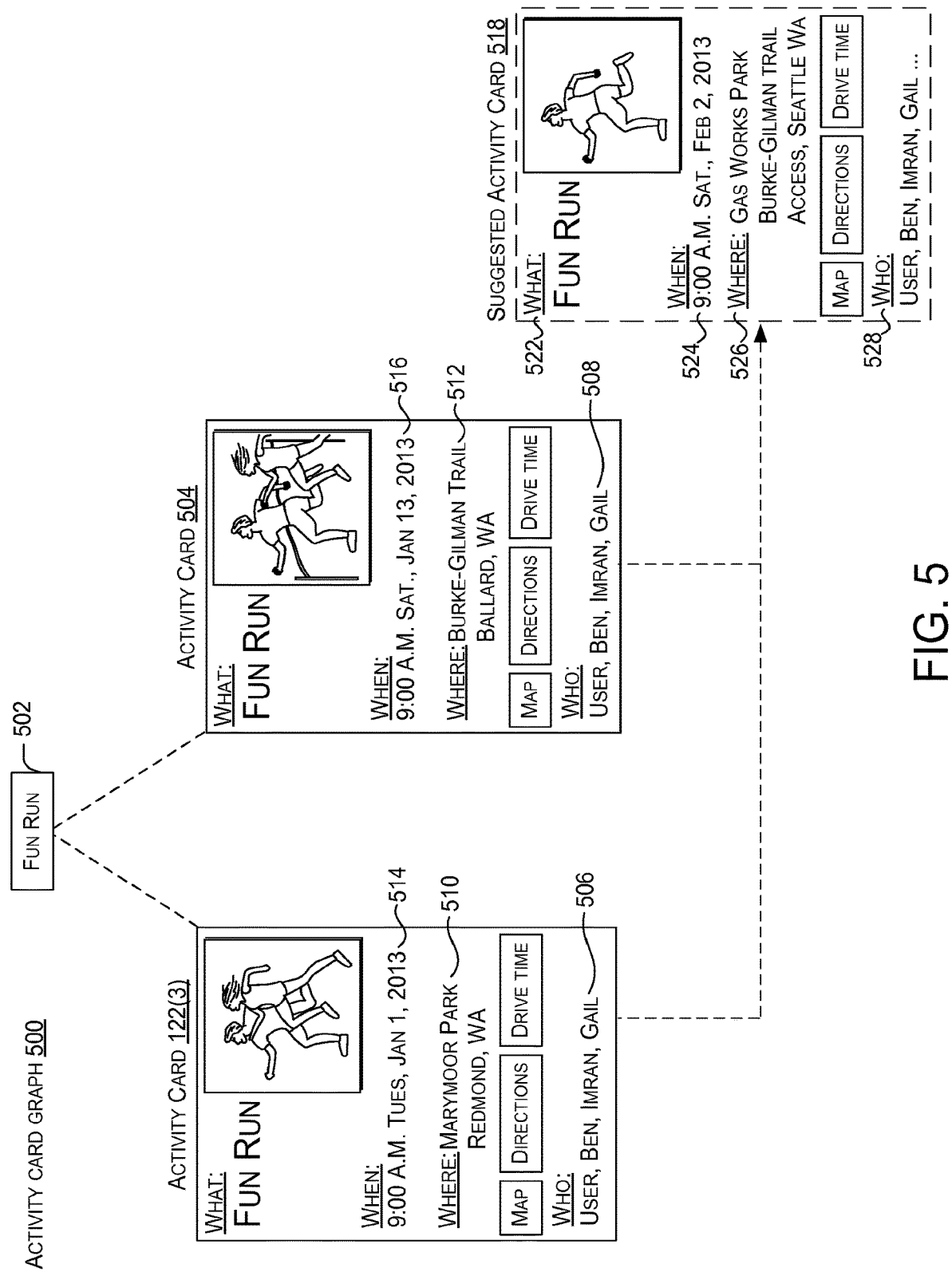
FIGS. 5-6 show examples of activity graphs in accordance with some implementations of the present concepts.

FIG. 5 shows an activity graph 500 that can enable the activity card concepts described above. Viewed from one perspective, an activity graph can identify relationships between activity cards. The relationship can be based upon any common, similar, shared, and/or related information from the activity cards, such as common titles, common locations, common users, common discussion terms, etc. In this example, the activity graph 500 relates to fun runs as indicated at 502. The activity graph 500 includes activity card 122(3) and activity card 504. Further, in this example, these activity cards also include overlapping and/or similar details. For instance, both activity cards include the same participants (e.g., an identical entry or equivalent entry) as indicated at 506 and 508. Both activities occur at similar (e.g., relatively close) locations. In this case, the locations are "Marymoor Park Redmond Wash." as indicated at 510 and the Burke-Gilman Trail Ballard WA as indicated at 512. Further, still, the activities occurred on 9:00 A.M. Tues. Jan. 1, 2013 as indicated at 514 and 9:00 A.M. Sat. Jan. 13, 2013 as indicated at 516. Each of these details can be considered an edge in the activity graph 500. A prognostic value or strength can be assigned to the respective edges. For instance, two activity cards about fun runs that occurred ten years apart on different continents, but shared a single participant may be viewed as providing less valuable information than the scenario described here where the events happened within two weeks of each other, within a few miles of each other, and with the same participants.

Stated another way, activity graph 500 can be thought of as representing a subset of all available activity cards. In this example, the activity cards can first be filtered based upon the activity (e.g., fun run) and then filtered based upon another relationship (e.g., common users, similar locations, etc.). The activity graph can then represent the filtered relationships. The filtering can be performed on an exact match basis (e.g., both activity cards 122(3) and 504 include the activity "Fun Run" and include "User, Ben, Imran, Gail" as participants). Alternatively or additionally, the filtering can be 'smart' filtering which identifies potentially interesting relationships even though they are not exact matches (e.g., Marymoor Park Redmond Wash. and the Burke-Gilman Trail Ballard WA, are not exact matches, but can nonetheless be identified as related enough to potentially be of interest). Smart filtering can be achieved utilizing various techniques and or resources, such as the resources described above relative to FIGS. 3-4.

The activity graph 500 can be utilized in various ways. One of those ways is to generate and suggest additional activity cards, such as suggested activity card 518. In this case, the suggested activity card includes a "What:" field 522, a "When:" field 524, a "Where:" field 526, and a "Who:" field 528. The suggested activity card can be populated with information obtained utilizing the information from the activity graph as well as other resources, such as the resources described above relative to FIGS. 3-4. For instance, in this example, the activity graph 500 provides indicia that the User, Ben, Imran, and Gail are/were participating in fun run activities.

Further, by applying resources, such as a search engine resources 306(3) (FIGS. 3-4) to the location of activity cards 122(3) and 504 can indicate that the activities are going to occur/occurred in the north Seattle area. As such, this information can be utilized in generating the suggested activity card 518. For example, analysis of other fun run cards in the north Seattle area could indicate that Gas Works Park in Seattle with its access to the Burke-Gilman trail is a popular and/or highly rated fun run location. Alternatively or additionally, this information could be obtained from the search engine resources, and/or other resources. Accordingly, the suggested activity card 518 can be autopopulated with this location as indicated at 526.

Further, the personal calendars of the User, Ben, Imran and Gail could be checked utilizing the global contacts/calendaring service resource 306(1) (FIGS. 3-4) and/or the professional calendars of the User, Ben, Imran and Gail could be checked utilizing the enterprise directory service resource 306(2) (FIGS. 3-4) to identify open times to schedule the fun run. The information from the global contacts/calendaring service resource 306(1) and the enterprise directory service resource 306(2) can be augmented with the information from activity cards 122(3) and 504 of activity graph 500. For instance, the fun run of activity card 122(3) occurs/occurred on a holiday and the fun run of activity card 504 occurs/occurred on a weekend. Thus, this information can be utilized as an indicator that the User, Ben, Imran, and Gail are more likely to engage in another fun run activity on a non-business day. Various techniques and/or resources can be utilized to make this determination. For instance, various natural language processing/natural language generation techniques combined with the search engine resource 306(3), the global contacts/calendaring service resource 306(1) and/or the enterprise directory service resource 306(2) can make the determination.

The information that the existing fun run activity cards occur on non-business days and information from their personal and/or professional calendars can be utilized to select an available date/time for the suggested fun run. In this example, the autoselected date time is indicated at 524. Consideration could also be given to other fun run activities scheduled for that date/time at this location. The other activities could be identified from other activities and/or or other resources, such as the search engine resources. The consideration could have either a negative or positive connotation. For instance, if too many other activities are scheduled at this park at approximately this time it may be too crowded and/or parking may be an issue. Alternatively, there may be another fun run activity scheduled for this time that the present participants may want to participate in rather than doing their own fun run. Such a determination can be based upon various factors. One factor can be analysis of activity card discussion (e.g., "I like our little fun runs more than fun runs with lots of people.") Another factor can be acceptance rates of activity cards (e.g., these users tend to accept these kinds of activity card invitations and not accept these kinds of activity card invitations).

Second Activity Graph Examples

Figure 6:
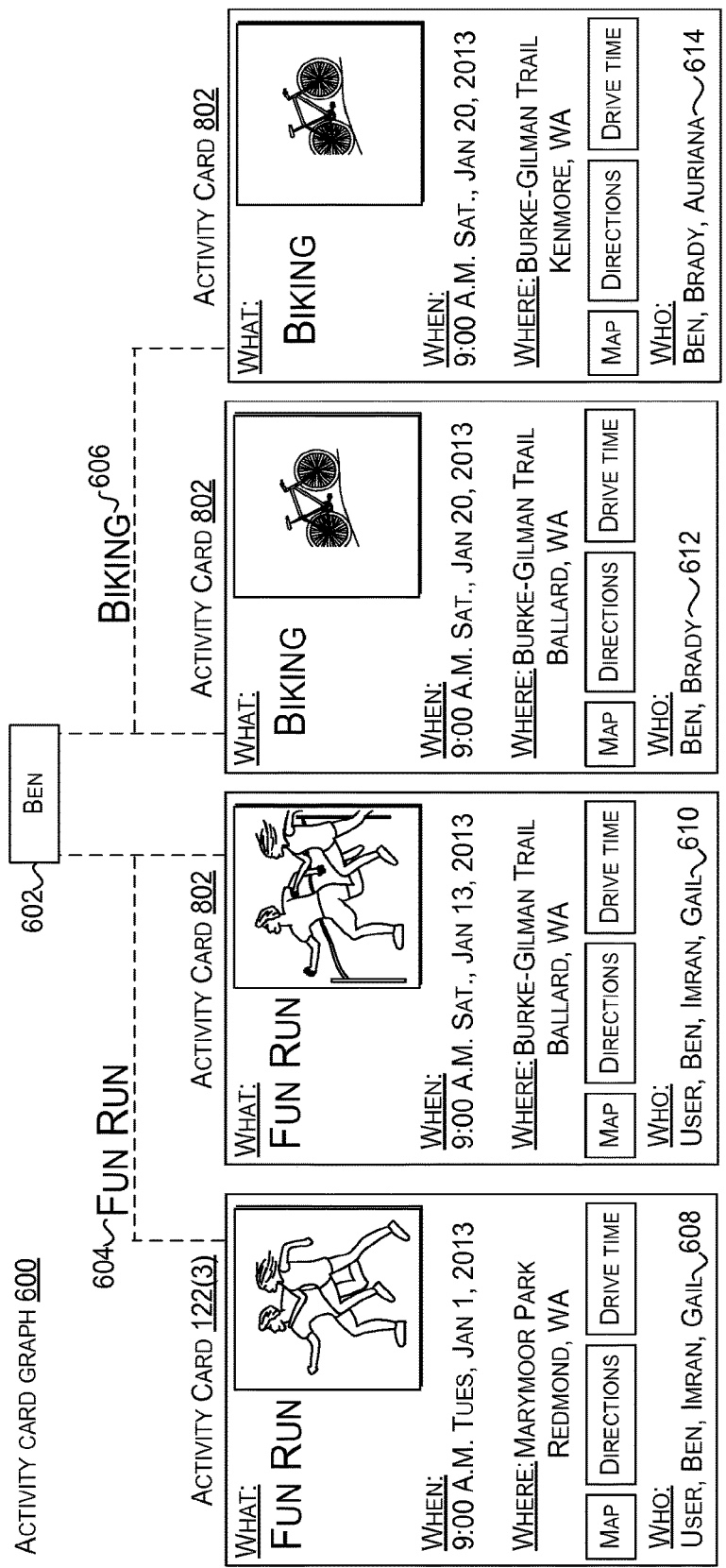

FIG. 6 shows an activity graph 600 that can enable the activity card concepts described above. In this case, the activity graph 600 is centered around a particular activity graph participant (e.g., Ben) as indicated at 602. This activity graph shows that Ben tends to engage in two types of activities: fun run activities as indicated at 604 and biking activities as indicated at 606. Various types of information about Ben can be identified based upon this organization or filtering. For instance, Ben tends to like to do fun runs with User, Imran, and Gail as indicated at 608 and 610. Also, Ben tends to like to go biking with Brady and sometimes Auriana as indicated at 612 and 614, respectively. Accordingly, as viewed from one perspective, activity graph 600 can be thought of as an activity profile for Ben.

Of course, activity graphs can be organized or filtered upon other information. For example, an activity graph where the location is "Marymoor Park" may indicate that the types of activities that occur at this park tend to relate to walking, running, and summer concerts. This information can contribute to the understanding of Marymoor Park as it relates to activity cards and/or to other resources. For instance, this information could be utilized to autopopulate an activity card location (e.g. where) field when a user is creating a new activity card relating to taking a walk with friends. Alternatively or additionally, this information can be supplied to the search engine resource 306(3) to enhance search results produced by the search engine resources. For instance, the information that Marymoor Park is a common location for summer concerts may be utilized as a factor in ranking results for a search query for "Seattle concerts". For example, without this information, the result Marymoor Park may not be presented in the ranked results, whereas with this information, Marymoor Park may be listed. Still in another case, this information may cause Marymoor Park to be ranked high in the summer, but not for the rest of the year.

Stated another way, this change in ranked order can be based upon the search engine resource considering the activity graph (and/or activity card) information and prior search queries rather than just prior search queries. This is of course just one more example of how information from activity cards can be utilized generally and/or by other resources.

Third System Examples

Figure 7:
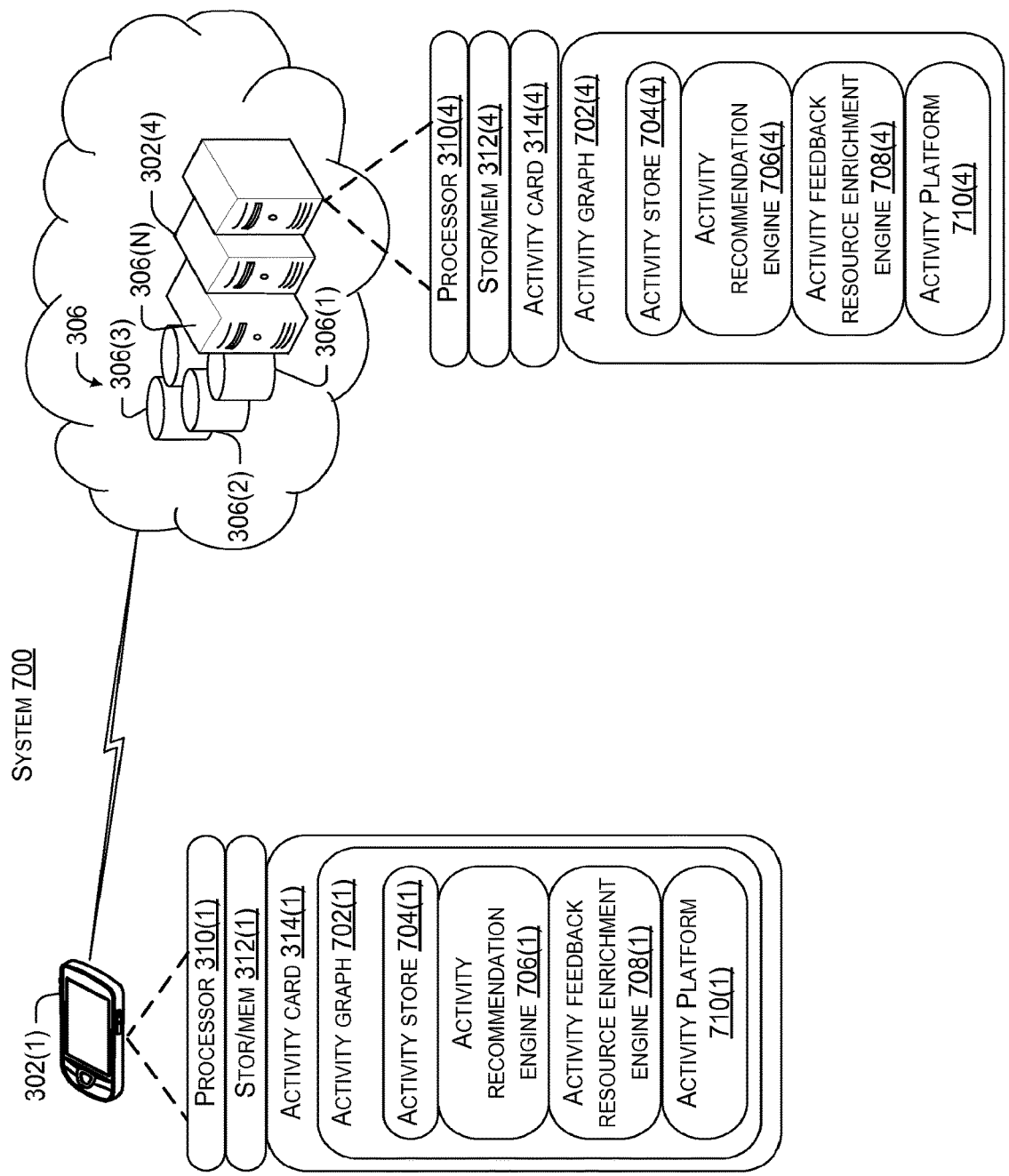
FIG. 7 illustrates an example of a system upon which activity graph functionalities can be accomplished in accordance with some implementations of the present concepts.

FIG. 7 shows system 700 that can enable the activity graph concepts described above, such as relative to FIGS. 5-6. For sake of brevity in this example system 700 carries over several of the elements of FIGS. 3-4 without reintroduction. (Some of the elements from FIGS. 3-4 are also eliminated for sake of brevity). System 700 introduces an activity graph component 702. In relation to device 302(1) the activity graph component 702(1) is an element of the activity card component 302(1). In relation to device 302(4), the activity graph component 702(4) is independent of the activity card component 302(4). As such, the activity graph component may occur on a device that does not include an activity card component and vice versa.

In this example, the activity graph component 702 includes an activity store 704, an activity recommendation engine 706, an activity feedback resource enrichment engine 708, and an activity platform 710. Alternatively, an instance of the activity graph component may not include all of these elements or may include other elements. For instance, rather than including an activity store, an instance of the activity graph component may access an activity store that is remote relative to the activity graph component.

The activity store 704 can be a database resource containing some or all of the activity cards that have been created in the system 700. The activity store 704 can be local to or remote from elements that utilize the activity cards contained in the activity store.

The activity recommendation engine 706 can identify relationships between activity cards in the activity store 704. Stated another way, the activity recommendation engine 706 can generate activity graphs that reflect relationships between activity cards. The activity recommendation engine can utilize information from the activity cards and/or activity graphs to generate 'suggested activity cards' for a user or location. The activity recommendation engine can generate the suggested activity card based on a given user's activity history, location, and/or social graph, among others. The activity recommendation engine can identify activities that the individual might be interested in participating in. The pool of potential activity recommendations can be fed by a variety of sources. For example, the pool can include activities that other people have initiated using the system. The potential activities can also include activities that a search engine has identified on the internet, based on metadata and/or entity extraction. The potential activities can also include activities that third parties have made available, using an activity graph API. In a client server configuration, the activity recommendation engine 706 can be located at the server, such as on the cloud. The activity recommendation engine can remotely generate the suggested activity card and communicate the remotely generated activity card to a user's device for presentation.

The activity feedback resource enrichment engine 708 can facilitate communicating information obtained from the activity cards and/or activity graphs back to other resources, such as those described relative to FIGS. 3-6. For instance, in the example described above relative to FIG. 6, the activity feedback resource enrichment engine 708 can provide the information about Marymoor Park from the activity graph (e.g., what activities tend to occur at the park) back to the search engine resource. The search engine resource can then utilize this information to rank results for subsequent search queries involving Marymoor Park. Similarly, the activity feedback resource enrichment engine 708 can provide information back to businesses about which sponsored activity cards where accepted by users and how these cards fit into various activity graphs. The businesses can then focus their advertising on subsequent activity cards based upon the user acceptance rate. This focused advertising can result in more effective advertising via activity cards. The results can be effective from the business perspective and user perception (e.g., users tend to like ads that are actually useful to them).

In summary, the activity feedback resource enrichment engine 708 can function to make the information garnered from the activity cards and/or activity graphs available to other resources. In some cases, the activity feedback resource enrichment engine can send the information to the other resources. In other cases, the activity feedback resource enrichment engine can make the information available to the other resources. For instance, the information can be stored in the activity store 704 for access by the other resources (either directly or via the activity feedback resource enrichment engine 708).

The activity platform 710 (e.g., Activity graph API) can be thought of as a mechanism for third parties to populate activities into the system 700. There are a variety of ways third parties could use the activities platform. For example, third parties could use the activity platform for advertising. For example, an activity provider (e.g., a Brazilian restaurant) might create ads for their restaurant to be shown to people who have historically eaten at Latin American restaurants (as determined from activity cards and/or activity graphs and/or otherwise), or who have indicated "Latin American food" as an interest on their Activity Profile. In such an example, the activity platform can operate cooperatively with the monetization engine resource described above relative to FIGS. 3-4.

Another way that third parties could use the activity platform is offers. For example an activity provider (e.g., a ski condo owner) might create an offer (ex: weekend ski condo rental for 6 people) and target the offer to individuals who have shown an interest in skiing on their activity profile. From one perspective, an activity profile can be thought of as including various activity cards and/or activity graphs that relate to the individual.

The activity card component 314 and the activity graph component 702 can be thought of as enabling a set of activity services that make it easy for people to discover, connect and plan, know and do, and remember and share activities. The activity card component 314 and the activity graph component 702 can address these issues and can deliver a more seamless, simple way for users to coordinate activities with others. As people start using these activity services, the activity graph component can start to amass a set of data about the activities people are participating in. Over time, this set of activities data can form the activity graph that can answer questions for a given user, such as where do they go, what do they spend time doing, and/or who do they do things with?

The activity graph component 702 can analyze the data set associated with the activity cards and can provide new value-added services for the people using the activity cards. For instance, the activity graph component can identify where do the users who go to particular places also like to go. The activity graph component 702 can then identify what new places to suggest for these users. Similarly, the activity graph component can identify what additional activities people who do these activities like to do. The activity graph component can then suggest new activities for these users. Similarly, the activity graph component can identify what other users also enjoy doing these activities. The activity graph component can then determine what new people to suggest to also engage in these activities.

First Method Example

Figure 8:
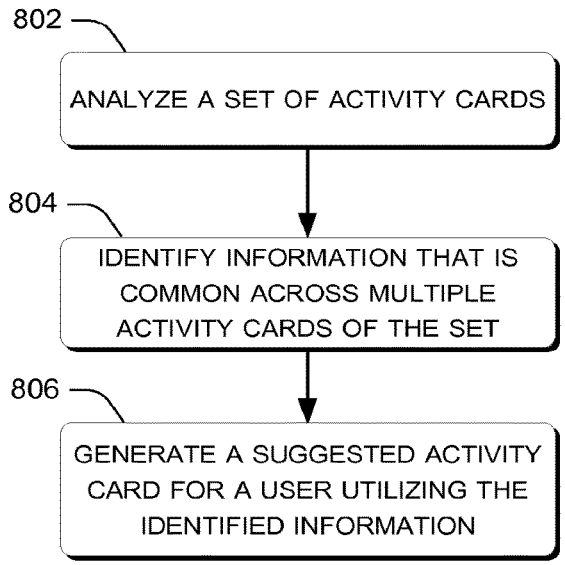
FIGS. 8-10 are flowcharts of activity card methods that can be accomplished in accordance with some implementations of the present concepts.

FIG. 8 shows a flowchart of a method 800 relating to activity cards and activity graphs.

The method can analyze a set of activity cards at 802.

The method can identify information that is common across multiple activity cards of the set at 804.

The method can generate a suggested activity card for a user utilizing the identified information at 806.

Second Method Example

Figure 9:
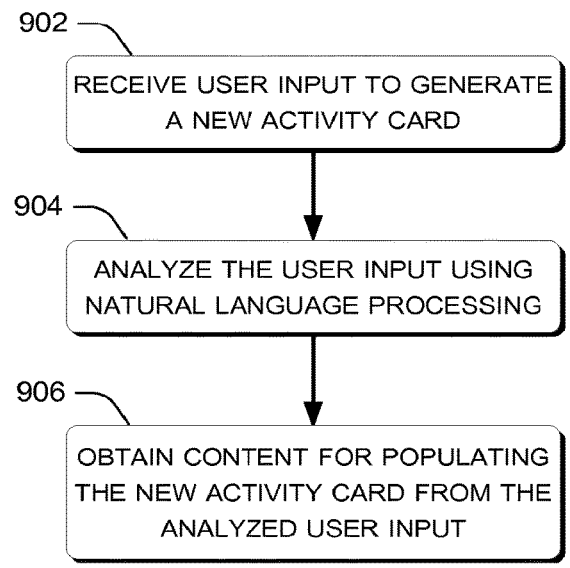

FIG. 9 shows a flowchart of a method 900 relating to activity cards and activity graphs.

The method can receive user input to generate a new activity card at 902.

The method can analyze the user input using natural language processing at 904.

The method can obtain content for populating the new activity card from the analyzed user input at 906. In some cases, the obtaining can be accomplished by populating the analyzed user input into the new activity card or searching other activity cards for content related to the analyzed user input. In other cases, the obtaining can be accomplished by identifying an activity graph that relates to the analyzed user input, or supplying the analyzed user input to a search engine as a search query and populating search query results on the new activity card. Of course, while analysis using natural language processing is described in this example, other types of analysis can be utilized in other implementations, either alone or in combination with natural language processing.

Third Method Example

Figure 10:
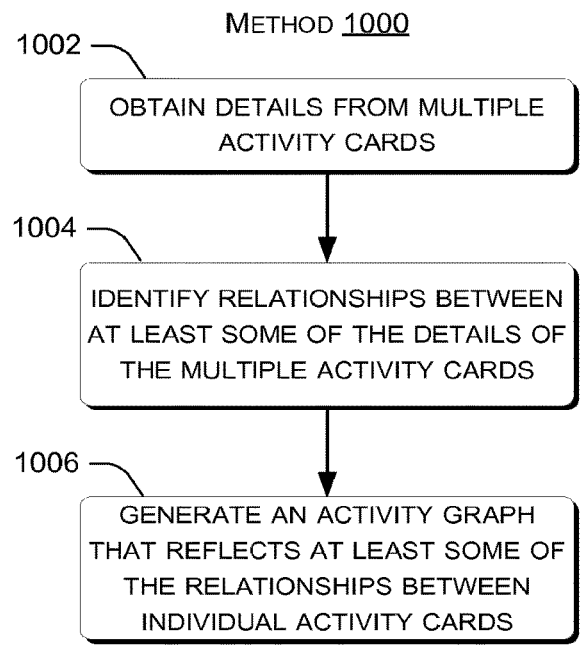

FIG. 10 shows a flowchart of a method 1000 relating to activity cards and activity graphs.

The method can obtain details from multiple activity cards at 1002.

The method can identify relationships between at least some of the details of the multiple activity cards at 1004.

The method can generate an activity graph that reflects at least some of the relationships between individual activity cards at 1006.

The methods can be performed by the computing devices described above relative to FIGS. 1A-1E, 2A-2C, and/or 3-7, and/or by other devices and/or systems.

The order in which the methods are described is not intended to be construed as a limitation, and any number of the described blocks can be combined in any order to implement the method, or an alternate method. Furthermore, the method can be implemented in any suitable hardware, software, firmware, or combination thereof, such that a computing device can implement the method. In one case, the method is stored on computer-readable storage medium/media as a set of instructions such that execution by a computing device causes the computing device to perform the method.

CONCLUSION

Although techniques, methods, devices, systems, etc., pertaining to activity graphs are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method performed on a computing device, the method comprising:
   receiving first user input from a first user relating to an activity to be performed with a second user;
   providing an activity card for the activity to the second user, the activity card reflecting a plurality of activity details for the activity;
   obtaining second user input from the second user negotiating a particular activity detail with the first user;
   in at least one instance, receive further input from the first user or the second user to activate a locking feature of the activity card;
   responsive to the further input, set the particular activity detail to a final value specified by the negotiating; and
   provide an updated activity card to the first and the second user with the particular activity detail set to the final value.

2. The method of claim 1, further comprising:
   performing natural language processing on comments provided via the first user and the second user; and
   based at least on the natural language processing, determining at least two potential values for the particular activity detail; and
   prior to receiving the further input to activate the locking feature, populating the activity card with the at least two potential values for the particular activity detail.

3. The method of claim 2, further comprising:
   causing the activity card to display the at least two potential values for the particular activity detail with at least one visual characteristic to convey that the particular activity detail has not yet been finalized.

4. The method of claim 3, further comprising:
   populating the activity card with a graphical representation of the locking feature, the further input being received via the graphical representation; and
   selecting the final value for the particular activity detail from the at least two potential values.

5. The method of claim 4, further comprising:
   upon finalization of the particular activity detail, presenting the final value of the particular activity detail on the activity card with a different visual characteristic to convey that the particular activity detail has been finalized.

6. The method of claim 1, further comprising:
   determining different geographical locations of a first user device of the first user and a second user device of the second user; and
   providing different instances of the activity card to the first user and the second user based at least on the different geographical locations.

7. The method of claim 1, performed by a server in communication with a first user device of the first user and a second user device of the second user.

8. A system, comprising:
   a processor; and
   a computer-readable storage medium storing computer-readable instructions which, when executed by the processor, cause the processor to:
   store a set of previous activity cards containing previous activity details of previous activities, the previous activity details identifying participants in the previous activities and geographic locations of the previous activities;
   identify relationships between individual previous activity details in different previous activity cards;
   based at least on the identified relationships, identify a suggested future activity detail for a suggested future activity;
   generate a suggested activity card identifying the suggested future activity and the suggested future activity detail; and
   provide the suggested activity card to a user device of an individual user.

9. The system of claim 8, wherein the suggested future activity detail specifies a type of activity to be performed.

10. The system of claim 8, wherein the computer-readable instructions, when executed by the processor, cause the processor to:
    identify a particular person that is identified in the previous activity details of at least two of the previous activity cards; and
    automatically add the particular person to the suggested activity card as a suggested participant.

11. The system of claim 8, wherein the computer-readable instructions, when executed by the processor, cause the processor to:
    identify a particular geographic location in the previous activity details of at least two of the previous activity cards; and
    automatically add the particular geographic location to the suggested activity card as a suggested location.

12. The system of claim 8, wherein the computer-readable instructions, when executed by the processor, cause the processor to:
    identify previous activity dates identified in the previous activity details of at least two of the previous activity cards; and
    based at least on the previous activity dates, automatically add at least one suggested future activity date to the suggested activity card.

13. The system of claim 8, wherein the computer-readable instructions, when executed by the processor, cause the processor to:
    receive a search query relating to a particular activity;
    obtain search results relating to different locations for conducting the particular activity; and
    rank the search results for the search query based at least in part on a particular geographic location identified in the previous activity cards.

14. The system of claim 8, wherein the computer-readable instructions, when executed by the processor, cause the processor to:

generate an activity graph of the previous activity cards; and evaluate the activity graph to identify the relationships.

15. A method performed on a computing device, the method comprising:

receiving user input from a plurality of user devices, the user input specifying activity details for different activities;

populating different activity cards with the activity details;

sending the different activity cards to respective user devices associated with respective users;

receiving a query from an individual user device specifying a search term for searching the different activity cards;

searching the different activity cards to identify a particular activity card that matches the search term; and sending the particular activity card to the individual user device responsive to receiving the query.

16. The method of claim 15, further comprising:

populating the different activity cards with discussion content provided via the user input; and searching the discussion content to identify the particular activity card that matches the search term.

17. The method of claim 16, further comprising:

visually distinguishing the search term from other discussion content on the particular activity card.

18. The method of claim 16, further comprising:

updating the discussion content on the different activity cards as comments are received from different user devices of different users.

19. The method of claim 18, further comprising:

performing natural language processing on the discussion content to identify undecided activity details that have not been finalized; and updating individual activity cards to include the undecided activity details.

20. The method of claim 19, further comprising:

selecting one or more final activity details from the undecided activity details in the absence of user input; and updating the individual activity cards with the one or more final activity details.

\* \* \* \* \*